United States Patent
Yu (10) Patent No.: US 6,653,973 B2
(45) Date of Patent: Nov. 25, 2003

(54) ADAPTIVE DIGITAL BEAMFORMING RADAR METHOD AND SYSTEM FOR MAINTAINING MULTIPLE SOURCE ANGLE SUPER-RESOLUTION CAPABILITY IN JAMMING

(75) Inventor: Kai-Bor Yu, Niskayuna, NY (US)

(73) Assignee: Lockheed Martin Corporation

( * ) Notice: Subject to any disclaimer, the term of this patent is extended or adjusted under 35 U.S.C. 154(b) by 0 days.

(21) Appl. No.: 09/949,032

(22) Filed: Sep. 7, 2001

(65) Prior Publication Data

US 2003/0058153 A1 Mar. 27, 2003

(51) Int. Cl.[7] ............................. G01S 13/48; G01S 7/36
(52) U.S. Cl. ............................ 342/90; 342/17; 342/154
(58) Field of Search ..................... 342/17, 90, 154, 342/149, 157

(56) References Cited

U.S. PATENT DOCUMENTS

| | | | |
|---|---|---|---|
| 4,835,689 A | 5/1989 | O'Donnell | 364/413.25 |
| 4,982,150 A | 1/1991 | Silverstein | 324/77 |
| 4,989,143 A | 1/1991 | O'Donnell et al. | 364/413.25 |
| 5,068,597 A | 11/1991 | Silverstein et al. | 324/77 |
| 5,117,238 A | 5/1992 | Silverstein | 342/373 |
| 5,262,785 A | 11/1993 | Silverstein | 342/162 |
| 5,262,789 A | 11/1993 | Silverstein | 342/368 |
| 5,294,933 A | 3/1994 | Lee et al. | 342/159 |
| 5,371,506 A | 12/1994 | Yu et al. | 342/380 |
| 5,487,306 A | 1/1996 | Fortes | 73/597 |
| 5,515,060 A | 5/1996 | Hussain et al. | 342/376 |
| 5,531,117 A | 7/1996 | Fortes | 73/602 |
| 5,600,326 A | 2/1997 | Yu et al. | 342/17 |
| 5,630,154 A | 5/1997 | Bolstad et al. | 395/800 |
| 5,892,700 A | 4/1999 | Haardt | 364/807 |
| 6,084,540 A | 7/2000 | Yu | 342/17 |
| 6,087,974 A | 7/2000 | Yu | 342/62 |
| 6,157,677 A | 12/2000 | Martens et al. | 375/240.16 |

OTHER PUBLICATIONS

Qui Lijun et al., "Studies of Subarray Adaptive Digital Beamforming for Sparse Phased Array Radar", Proceedings of the IEEE 1996 National Aerospace and Electronics conference, 1996. NAECON, pp.351–354, May 1996.*

Yu et al., "Sub–array–based phase–only transmit nulling for jamming and clutter suppression", Proceedings–of–the–SPI-E–The–International–Society–for–Optical–Engineering (USA), vol. 2845, p. 56–65, 1996.*

Wax and Kailath, "Detection of Signals by Information Theoretic Criteria", IEEE Transactions on Acoustics, Speech and Signal Processing, vol. ASSP–33, No. 2, pp. 387–392, 1985.

Akaike, "A New Look at the Statistical Model Identification", IEEE Transaction on Automatic Control vol. AC–19, No. 6, pp. 716–723, 1974.

Steyskal and Rose, "Digital Beamforming for Radar Systems",Microwave Journal, pp. 121–136 1989.

Steyskal, "Digital Beamforming Antennas", Microwave Journal, pp. 107–124,1997.

Davis et al. "Nulling Over Extremely Wide Bandwidth When Using Stretch Processing", The MITRE Corp., p. 1–6, date unknown.

(List continued on next page.)

Primary Examiner—Ian J. Lobo
(74) Attorney, Agent, or Firm—Duane Morris LLP (57) ABSTRACT

A method and system for are provided for detecting one or more radar targets of interest in the presence of jamming signals. A plurality of sub-arrays are formed from an antenna array. Sub-array beams are adaptively formed so as to point one or more nulls in one or more respective directions corresponding to one or more jammers. A super-resolution technique is applied to determine a count of the one or more radar targets and to determine the corresponding direction of arrival.

16 Claims, 5 Drawing Sheets

OTHER PUBLICATIONS

Brookner and Howell "Adaptive –Adaptive Array Processing", Proceedings of the IEEE, vol. 74, No. 4, Apr. 1986, pp. 602–604.

Baltersee, Jens, "Smart Antennas and Space–Time Processing", visited Aug. 14, 1921, http://www.ert.rwth–aachen.de/Personen/baltersee/smart/smart.html.

Plonski, Matthew, "CSD Jul. 2000 Feature: Smart Antenna Schemes for E–911", pp. 1–7, http://www.csdmag.com/main/2000/07/0007feat4.htm visited Aug. 13, 2001.

Ebihara et al., Music Algorithm for a Directional Borehole Radar Using a Conformal Array Antenna, date unknown.

Cheney, Margaret "The Linear Sampling Method and the MUSIC Algorithm", Apr. 2, 2001, pp. 1–6, CODEN:LUT-EDX/(TEAT–7089)/1–6/(2000).

Liu et al., An ESPRIT Algorithm for Tracking Time–Varying Signals, TR 92–54, Apr. 24, 1992, pp.1–22.

Haykin, Simon, "Modern Filters", Macmillan Publishing Co., New York, NY, 1989, pp. 2, 324, 330–333, 337–343.

Schmidt, R.O. Multiple Emitter Location and Signal Parameter Estimation, IEEE, vol. AP–34, No. 3, Mar. 1986.

* cited by examiner

ADAPTIVE DIGITAL BEAMFORMING RADAR METHOD AND SYSTEM FOR MAINTAINING MULTIPLE SOURCE ANGLE SUPER-RESOLUTION CAPABILITY IN JAMMING

FIELD OF THE INVENTION

The present invention relates to radar systems generally, and more specifically to radar systems that determine direction of arrival of one or more targets in the presence of jamming.

BACKGROUND OF THE INVENTION

Modern radar's function, in addition to conventional target detection and tracking, involves target discrimination and kill assessment. Current radar systems cannot resolve multiple sources within a resolution cell. Modern signal processing techniques can determine the number of sources and resolve the associated azimuth and elevation angles beyond the Rayleigh resolution using model-based approach. This set of techniques is called super-resolution techniques. Super-resolution techniques are being investigated for insertion into emerging radar products.

Modern radars are vulnerable to diverse threats: intentional jamming, spoofing and radar frequency interference (RFI). Also, in air and missile defense applications, the target complex may include countermeasures such as jamming and chaff. There is no known method of maintaining super-resolution capabilities in the presence of jamming.

SUMMARY OF THE INVENTION

The present invention is a method and system for detecting one or more radar targets of interest in the presence of jamming signals. A plurality of sub-arrays are formed from an antenna array. Sub-array beams are adaptively formed so as to point one or more nulls in one or more respective directions corresponding to one or more jammers. A super-resolution technique is applied to determine a count of the one or more radar targets.

DETAILED DESCRIPTION

The present invention relates to adaptive digital beamforming (ADBF) techniques and systems for maintaining capability to determine direction of arrival (DOA) angle of multiple sources with super-resolution in the presence of jamming. This technique exploits flexibility provided by digital beamforming (DBF) to form sub-array beams in canceling jamming, followed by super-resolution processing for determining the number of sources and the corresponding azimuth and elevation angles using the sub-array outputs.

In this arrangement, super-resolution capability in angle estimation of multiple sources can be maintained while jamming is canceled in the sub-array pre-processing beamforming. The jamming cancellation can be characterized in terms of adaptive sub-array beam patterns where nulls are formed responsive to one or more jammers. The super-resolution capability can be characterized by the MUSIC spectrum, wherein spectral peaks correspond to the source angles. The joint adaptive cancellation and super-resolution capability can be characterized by the product of the two patterns showing the nulls responsive to jammers and the peaks corresponding to the source angles.

Consider a received DBF array where array measurements can be digitally summed to form a number of sub-array beams, which can be overlapped. The amount of overlap is determined by factors such as beamwidth, degrees-of-freedom required for adaptive processing and the remaining degrees for super-resolution processing. For example, consider the following array of 32×32 which can be sub-array beamformed to form a 4×4 grid of 16 sub-arrays, each sub-array having 64 elements. The sub-array patterns are related to each other by a phase factor depending on the locations of the sub-array, $$Q_k(T_x, T_y) = Q(T_x, T_y)e^{j\frac{2\pi}{\lambda}(T_x x_k + T_y y_k)} \quad (1)$$

where $Q(T_x, T_y)$ a common sub-array factor located at the center of the array.

The sub-array measurements can then be used for super-resolution processing. Several super-resolution processing techniques are available (e.g. the well known MUSIC and ESPRIT techniques). The number of sources can be determined by using statistical criteria, such as the Akaike Information Criterion (AIC), which is described in H. Akaike, or Minimum Description Length (MDL) may be used for refinement of the estimated number of targets. AIC is described in H. Akaike, "A New Look at the Statistical Model Identification, IEEE Trans. Automatic Control, vol. 19, pp 716–723, 1974," which is incorporated by reference herein in its entirety. MDL is described in M. Wax and T. Kailath, "Detection of signals by Information Theoretic Criteria," IEEE Trans. Acoustics, Speech and Signal Processing, vol. ASSP-33, No. 2, pp. 387–392, April 1985, which is incorporated by reference herein in its entirety. Other alternative algorithms may be used.

When there is jamming, adaptive beamforming can be applied to the sub-arrays for jamming cancellation instead of using conventional beamforming. A number of adaptive algorithms can be used: (1) main-auxiliary adaptation, (2) adaptive—adaptive processing, (3) fully adaptive array; and (4) adaptive processing on the column/row beamformer outputs.

In main-auxiliary adaptation scheme, main beam and auxiliary beams are formed from the available elements, which are capable of being shared (commonly called elements reuse). The auxiliary beams can then be used to cancel jamming in the sub-array sum beam.

In the adaptive—adaptive processing technique, the auxiliary beams are steered in the direction of the jammers. As is the case in the main auxiliary adaptation technique, the auxiliary beams are used to cancel jamming in the sub-array sum beam. For example, in a sub-array having 64 elements, all of the elements are added into the sum, and some of the 64 elements (e.g., only 4–5) are used for some auxiliary adaptation.

In a fully adaptive approach, all the elements within the sub-array are used to cancel jamming as part of the sub-array beamforming. In order to reduce computational complexity (for example, to reduce the number of analog-to-digital converters, or ADCs), the fully adaptive approach can be modified to have column beamforming followed by adaptive processing on the column-sum/row-sum beams. In each case, a main beam constraint is applied such that the gain with respect to the array center is maintained. For example, in the context of fully adaptive array, the adaptive processing can be formulated as using the sub-array degrees-of-freedom to cancel jamming subject to the constraint of sub-array bore-sight gain. The problem is formulated as follows for the first sub-array:

Minimize:

$$J_1 = W_1^H R_1 W_1 - \lambda(S_1^H W_1 - g_1) \quad (2)$$

where $J_1$ is the received power of the jammer, $W_1$ is the adaptive weight for sub-array number 1, $R_1$ is the covariance matrix measurement of the first sub-array, the superscript H indicates the complex conjugate transpose, $S_1$ is the sub-array steering vector and $g_1$ is the bore-sight sub-array gain. The adapted weight is given by the following:

$$W_1 = \frac{R_1^{-1} S_1}{S_1^H R_1^{-1} S_1} g_1 \quad (3)$$

Similarly, the adaptive weight $W_k$ can be derived for each other one of the k sub-arrays. Note that theoretically the adapted sub-array factors have identical nulls responsive to mainlobe or sidelobe jammers. In order to force identical nulls, which are required for maintaining the super-resolution processing capabilities or pattern product property, one sets the adaptive weights to be the same for each sub-array by using the following scheme:

$$W = \frac{\left(\sum_{k=1}^{K} R_k\right)^{-1} S_1}{S_1^H \left(\sum_{k=1}^{K} R_k\right)^{-1} S_1} g_1 \quad (4)$$

where $R_k$ is the covariance matrix of the k-th sub-array. This adaptive weight can also be interpreted as the common weight used to minimize the sum of jamming for all the sub-arrays, i.e.

Minimize:

$$J = W^H \left(\sum_{k=1}^{K} R_k\right) W - \lambda(S^H W - g) \quad (5)$$

The adaptive sub-array patterns can also be related to a common adapted sub-array factor located at the center of array as following:

$$\hat{Q}_k(T_x, T_y) = \hat{Q}(T_x, T_y) e^{j\frac{2\pi}{\lambda}(T_x x_k + T_y y_k)} \quad (6)$$

Adaptively estimated values are represented by placing a circumflex ("^") over the estimated variable or quantity. The adaptive beam pattern formed from elements of each sub-array result in identical nulls responsive to mainlobe or sidelobe jammers.

This is a two-stage processing scheme, where jamming is canceled in the first stage within the sub-arrays, with the same adaptive weights used for each sub-array. Then, spatial degrees of freedom across the sub-arrays are used for super-resolution processing to determine the number of sources and the associated azimuth and elevation angles.

Figure 1:
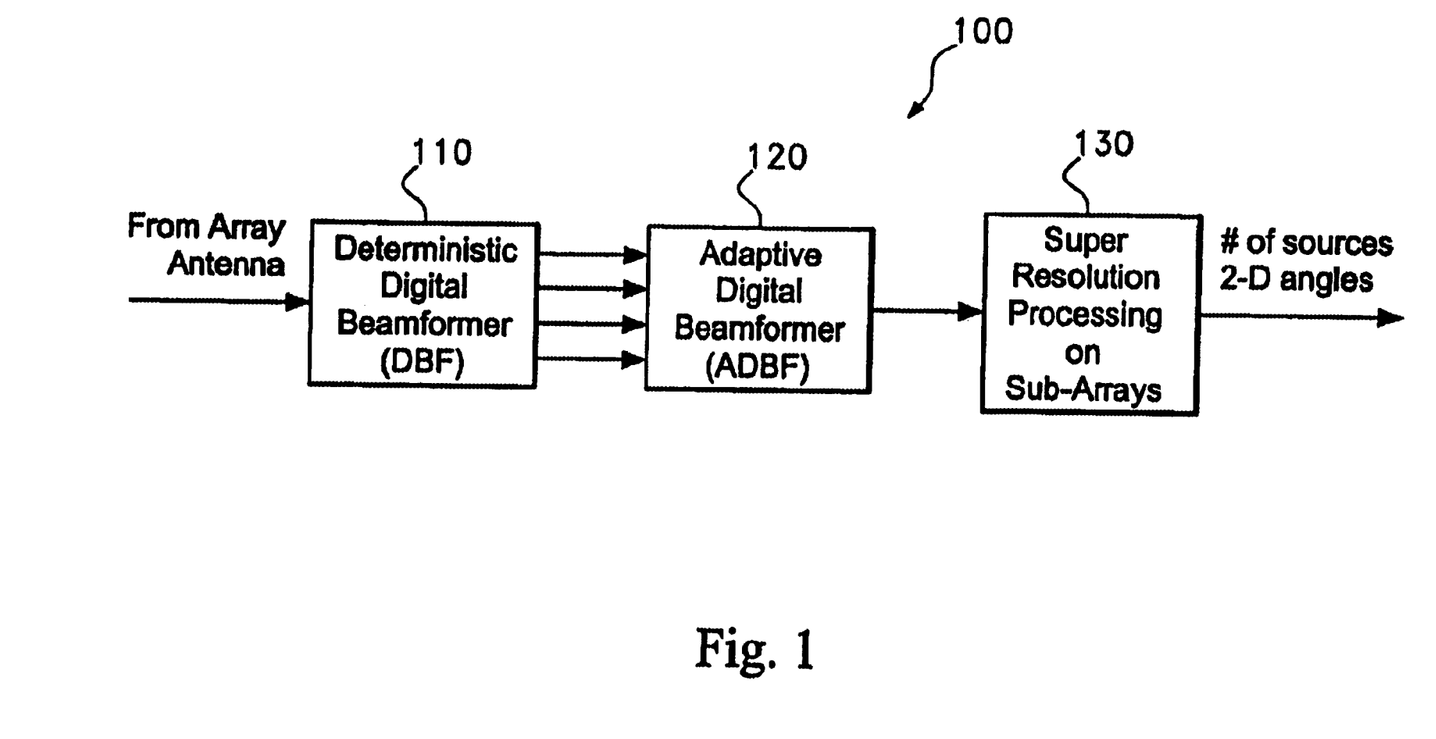
FIG. 1 is block diagram of an exemplary system according to the present invention.

The two-step beamforming is described in FIG. 1 where adaptive beamforming is followed by super-resolution processing. Deterministic digital beamforming may be employed to reduce the degrees of freedom for adaptive cancellation. For example, conventional deterministic methods may be used to form sum, $\Sigma$, and difference, $\Delta$, beams.

Adaptive digital beamforming can be carried out to cancel jamming. Identical adaptive weights for each of the sub-arrays maintain super-resolution capabilities. The resulting adapted sub-array outputs are then used for super-resolution processing. A number of schemes such as MUSIC and ESPRIT can be used for this purpose. If an ESPRIT algorithm is used, the technique may be either a two-dimensional ESPRIT or one-dimensional ESPRIT. technique.

SIMULATION EXAMPLE

Figure 2:
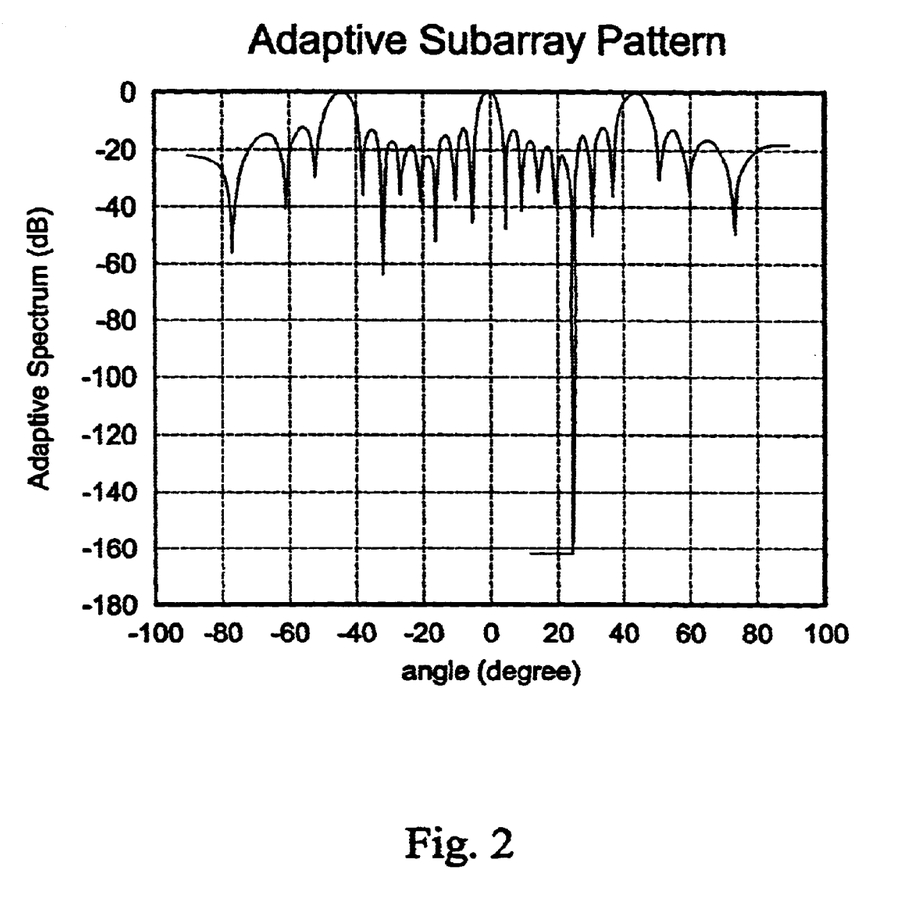
FIG. 2 is a diagram of an adaptive sub-array beam pattern for jamming cancellation, showing a null responsive to a jammer at 25 degrees.

Consider a linear array with 32 elements with half-wavelength spacing. The array is divided into 4 sub-arrays, each with 8 degrees-of-freedom for adaptive jamming cancellation. Assume two sources (targets) located at 5 degrees and –2 degrees. A noise jammer is located at 25 degrees. Sub-array adaptive beamforming is applied with an adapted antenna pattern given by FIG. 2. FIG. 2 shows that the array has a deep null responsive to the broadband jammer at 25 degrees. The resulting sub-arrays are thus 8 element or 4 wavelengths spaced apart.

Figure 3:
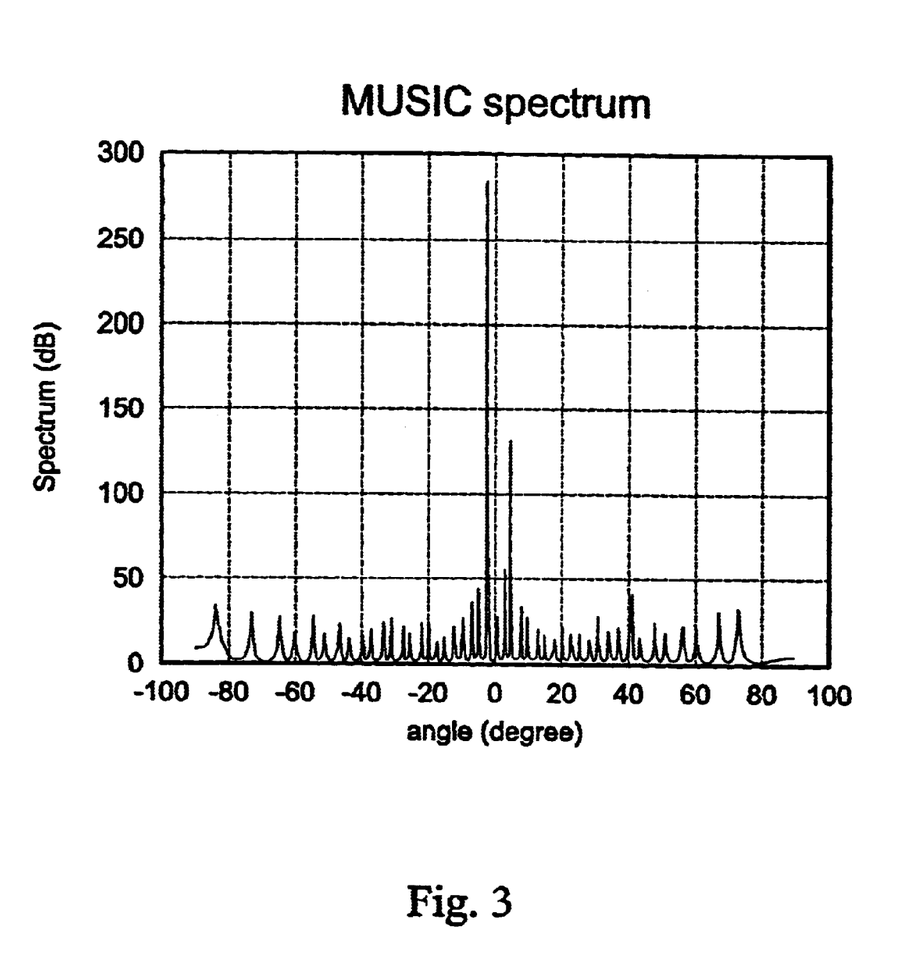
FIG. 3 is a diagram of the super-resolution MUSIC Spectrum showing the target sources at 5 degrees and −2 degrees.
Figure 4:
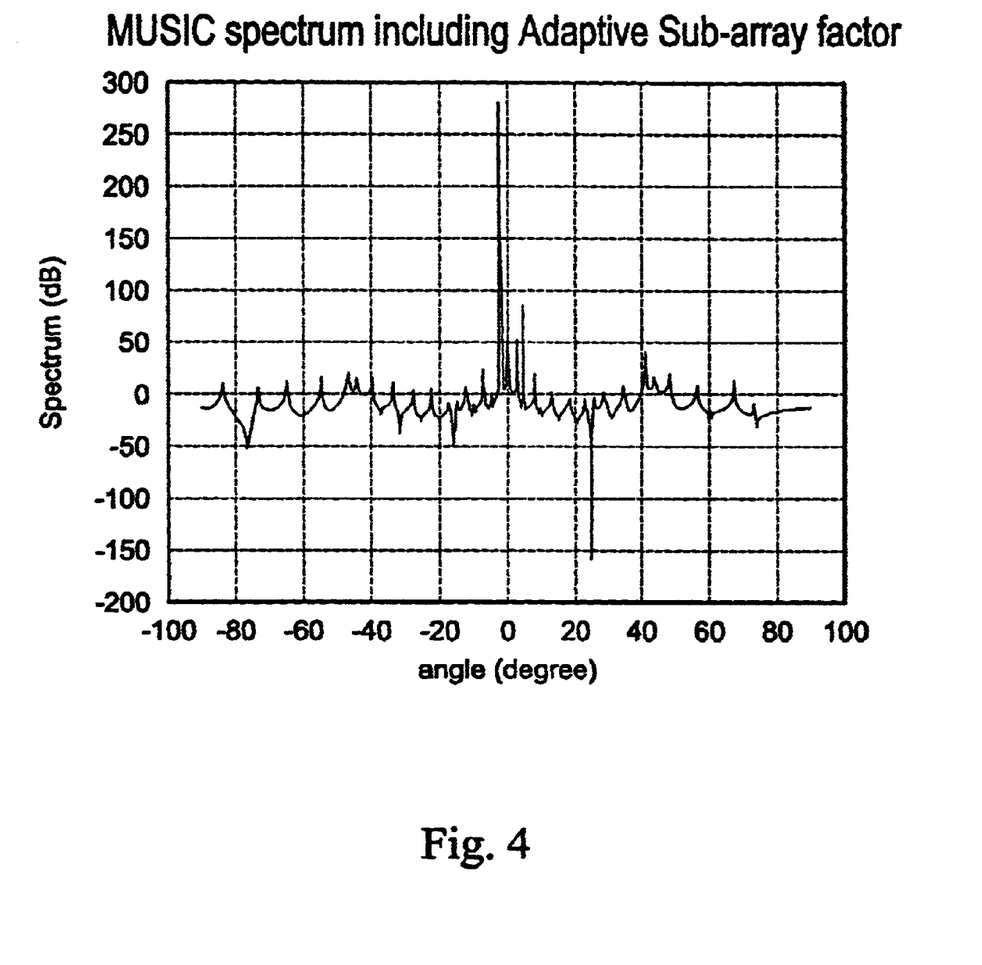
FIG. 4 is a diagram of the MUSIC Spectrum including the adaptive sub-array pattern, showing the target sources at 5 degrees and −2 degrees and a null responsive to a jammer at 25 degrees.
Figure 5:
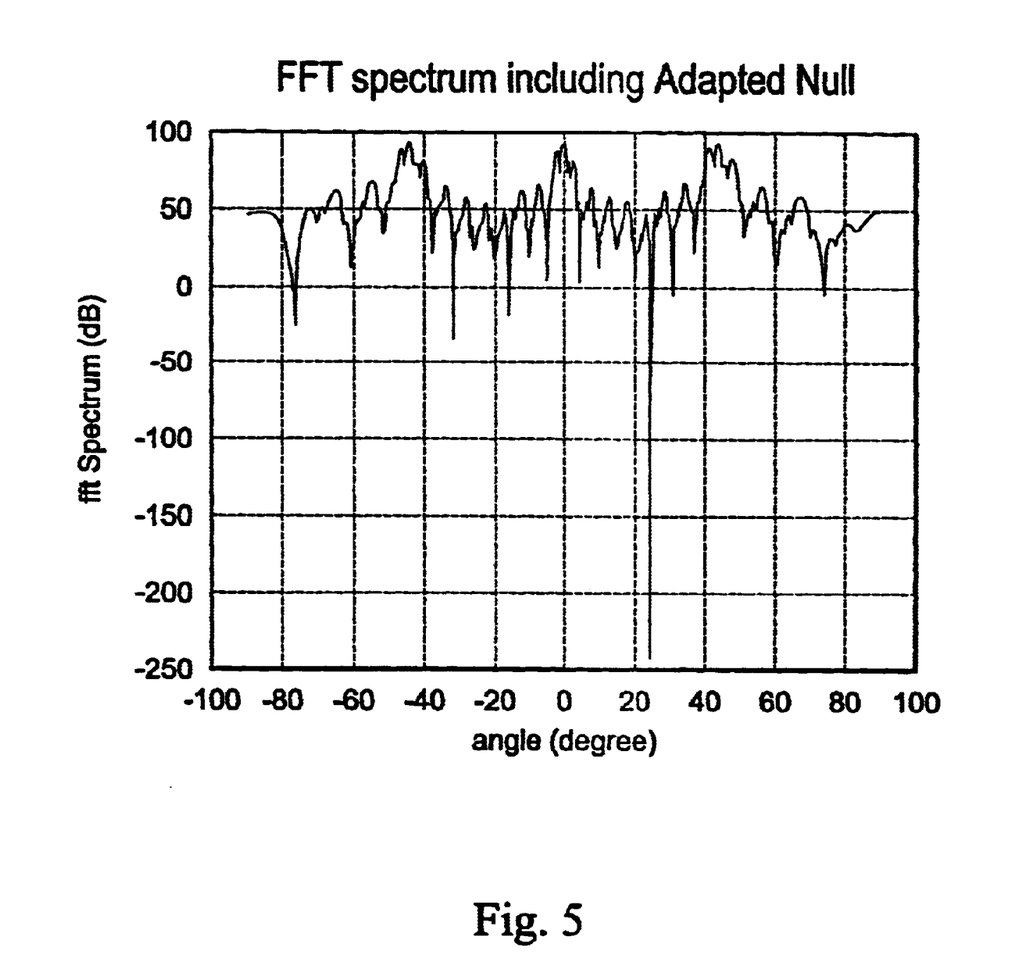
FIG. 5 is a diagram of the FFT spectrum of the sources including the adaptive pre-processing.

A super-resolution algorithm such as MUSIC or ESPRIT may be applied to give the azimuth and elevation angle estimate of the two sources. FIG. 3 shows the MUSIC spectrum for this scenario, with super-resolution performance showing peaks at 5 degrees and –2 degrees corresponding to the source angles. FIG. 4 shows the product of the spectrums of FIGS. 2 and 3, including a null responsive to the jammer (25 degrees) and two peaks corresponding to the source angles (–2 and 5 degrees). FIG. 5 provides a basis for comparison. FIG. 5 shows the FFT spectrum of the sources, including the adaptive pre-processing. Thus, FIG. 5 corresponds to jammer cancellation without super-resolution. FIG. 5 shows that the two sources cannot be resolved within the main beam without applying a super-resolution technique, such as MUSIC or ESPRIT. FIG. 5 only shows a null at 25 degrees responsive to jammer.

Although the example of FIGS. 2–5 includes an antenna array divided into four subarrays, the invention may be practiced using any number of sub-arrays. For a given antenna with a fixed number of radiating elements, there is a tradeoff between jamming cancellation and super-resolution. Using a large number of elements in each sub-array provides a large number of degrees of freedom for jamming cancellation. However, the larger the number of elements per sub-array, the smaller the number of sub-arrays will be. Conversely, a large number of sub-arrays provides more degrees of freedom for super-resolution, but reduces jammer cancellation ability. One of ordinary skill in the art can readily weigh these competing objectives and determine a practical sub-array size for the expected environment in which any specific radar system will operate. For example, if a relatively small number of jammers is anticipated, then a smaller sub-array size can be used, providing more degrees of freedom for super-resolution.

Although the exemplary embodiment uses fully adaptive array processing, main-auxiliary adaptation, adaptive— adaptive processing, or adaptive processing on column/row beamformer outputs may be used as alternatives. This choice determines, within a subarray, how adaptation is done.

For example, a system having 64 degrees of freedom can cancel many jammers. For some applications, 64 degrees of freedom are not required, so it may be advantageous to form the beam. A few auxiliary beams may be used to do adaptation. For example, use of a column or row beamformer reduces the degrees of freedom. So, instead of 64, one can reduce the number of degrees of freedom to 16 or 8, for example, so that the computational requirements for the signal processor are less. The number of degrees of freedom for super-resolution is determined already. One can reduce the number of analog-to-digital converters (ADC's) by beamforming along the column before the ADC. Also the number of computations to get adaptive weights is small. Basically, the adaptive weight processing requires inversion of a matrix having a number of rows and number of columns equal to the number of degrees of freedom.

Optionally, polarization may also be done for the adaptive processing. Polarization adds another degree of freedom that can be applied. Polarization can be added on to jamming cancellation or super-resolution.

The MUSIC algorithm and its root-finding variations are briefly reviewed here. Suppose at time t, the estimated covariance matrix has the following eigenvalue decomposition (EVD):

$$R = \sum_{i=1}^{N} \lambda_i q_i q_i^H \qquad (8)$$

$$= \sum_{i=1}^{K} \lambda_i q_i q_i^H + \sigma^2 \sum_{i=k+1}^{n} q_i q_i^H$$

The algorithm depends on the fact that that the noise subspace $E_N = [q_{K+1} \ldots q_M]$ is orthogonal to the signal manifold; i.e., $$E_N^H u(\theta) = 0 \qquad (9)$$

where $u(\theta)$ is the steering vector of the angles to be searched. The conventional MUSIC algorithm involves searching $J(\theta)$ for the peaks of the following eigenspectrum:

$$J(\theta) = \frac{u^H(\theta)u(\theta)}{u^H(\theta)E_N E_N^H u(\theta)} \qquad (10)$$

To do this, the complete angular interval $$\frac{-\pi}{2} \leq \theta \leq \frac{\pi}{2}$$

is scanned. One can avoid the need for this one-dimensional scanning by the use of a root-finding approach. This can be accomplished by, for example, using a known root-MUSIC or minimum norm algorithm.

In the root-MUSIC algorithm, $$e^{j2\pi \frac{T_x d}{\lambda}}$$

is replaced by the complex variable z in the eigenspectrum $J(\theta)$ defined in equation (10). Let D(z) denote the resulting denominator polynomial. The polynomial D(z) can be expressed as the product of two polynomials, H(z) and $H(z^{-1})$, each with real coefficients. The first polynomial, H(z), has its zero inside or on the unit circle; K of them will be on (or very close to) the unit circle and represent the signal zero. The remaining ones represent extraneous zeros. The zeros of the other polynomial, $H(z^{-1})$, lie on or outside the unit circle, exhibiting inverse symmetry with respect to the zero of H(z). The angle estimation is thus performed by extracting the zeros of the polynomial D(z) and identifying the signal zeros from the knowledge that they should lie on the unit circle.

The minimum norm algorithm is derived by linearly combining the noise eigenvectors such that:

The first element of the resulting noise eigenvector is unity.

The resulting noise eigenvector lies in the noise subspace.

The resulting vector norm is minimum.

Equation (9) is then modified to $$A(\theta) = \frac{\delta_1^H E_N E_N^H u(\theta)}{\delta_1^H E_N E_N^H \delta_1} = 0 \qquad (11)$$

where $\delta_1^H = [10 \ldots 0]$. The angle estimation problem is then solved by computing the zeros of the resulting polynomial of equation (11) and identifying the signal zeros as the K zeros of A(z) that lie on (or very close to) the unit circle.

Although two variants of the MUSIC algorithm are described above, there are many other variants of the MUSIC algorithm that may alternatively be used. Further, a one or two dimensional ESPRIT algorithm may be used instead of a MUSIC algorithm.

ESPRIT Algorithm

The following is an exemplary ESPRIT algorithm that may be used in a system according to the invention. Other variants of the exemplary algorithm may alternatively be used.

Assume that d narrow-band plane waves are simultaneously incident on a planar array of m sensors, arranged in m/2 pairs, where m is an even integer. The distance $\Delta$ between sensors within each pair is the same, but the pairs may be positioned arbitrarily. Assume that the wave sources are in the same plane, the position of each source being defined by a single parameter $\theta_i \in [0, 2\pi]$, the direction of arrival of the ith source.

Hereinafter, data related to the first sensor in each pair is referred to by the subscript X and the data related to the second sensor in each pair is referred to by the subscript Y. Assume that all vectors are column vectors.

Based on the sensor data, the direction of arrival is found by determining the directions of the energy sources from which energy reaches the sensors. Given narrow-band signals having a known center frequency $\omega_o$, the relationship between the unknown signal $\underline{s}(t) \in C^d$ and the sensor output $\underline{z}_x(t) \in C^{m/2}$ and $\underline{z}_y(t) \in C^{m/2}$ is given by:

$$\underline{z}_x(t) = A\underline{s}(t) + \underline{\epsilon}_x(t), \quad (12)$$

$$\underline{z}_y(t) = A\phi\underline{s}(t) + \underline{\epsilon}_y(t), \quad (13)$$

or $$\underline{z}(t) = \begin{pmatrix} A \\ A\phi \end{pmatrix} \underline{s}(t) + \underline{\epsilon}(t) \quad (14)$$

where $\underline{\epsilon}(t)$ is the measurement noise, and $A \in C^{m/2 \times d}$ is the unknown matrix of array responses or array steering vectors, which depend on the DOA. $\phi$ is the unknown diagonal matrix, which is related to the phase delays between sensors in each respective sensor pair:

$$\phi_i = e^{j\omega_0 \Delta \sin \theta_i / c}, \ldots, d \quad (15)$$

The ESPRIT algorithm estimates the number of signals d and the DOA, $\theta_i$, i=1, ..., d. This can be accomplished by estimating the matrix $\phi$.

If no noise is present (i.e., $\underline{\epsilon}=0$), the range of the matrix A is the same as that of the matrix $Z_X$ formed from the n columns of sensor outputs (assuming that n is large enough), and is also the same as the range $Z_Y$ during the same interval. From the basis vectors for the range, a matrix is constructed that is similar to the matrix $\phi$. Therefore, because the matrix $\phi$ is a diagonal matrix, the non-zero elements of $\phi$ can be determined from the eigenvalues of the constructed matrix.

In stage 1, the basis for the range space of A is obtained.

In stage 2, the matrix $\phi$ is determined from the eigenvalues of the constructed matrix. The directions of arrival are determined from the matrix $\phi$.

Stage 1 is computationally intensive. Various methods are known for determining the range space basis, including:

computing singular value decomposition of the matrix $Z^H$; or computing the eigenvalue decomposition of the estimated covariance matrix $$\hat{R}_{zz} = \frac{1}{n} \sum_{i=1}^{n} z(t) z^H(t) = \frac{1}{n} ZZ^H. \quad (16)$$

Another alternative ESPRIT method that may be used is based on a singular value decomposition (SVD). The SVD of $Z^H$ is given by:

$$Z^H = U\Sigma V^H, \quad (17)$$

where U is an n×m matrix and V is an m×m matrix, both having orthonormal columns. $\Sigma$ is a diagonal matrix including the m singular values in descending order. The first d columns of V are the range space basis.

In an exemplary ESPRIT algorithm, a seven part analysis is performed. Four steps accomplish the required range space basis determination. The last three steps compute the matrix $\phi$ and the directions of arrival.

Step (1) Data measurements Z are obtained.

Step (2) The SVD of $Z^H$ is computed by $Z^H = U\Sigma E^H$.

Step (3) The number of sources d (the range of the matrix $Z^H$) is estimated, for example using the Akaike information criterion (AIC) or minimum description length (MDL) criterion.

Step (4) The range of $Z^H$ is $E_Z$, and is equal to the first d columns of E.

Step (5) The matrix $E_Z$ is partitioned into m/2×d blocks as $$E_Z = \begin{pmatrix} E_X \\ E_Y \end{pmatrix} \quad (18)$$

and the SVD of $(E_X E_Y)$ is found by:

$$(E_X E_Y) = W\Psi V^H. \quad (19)$$

Step (6) V is partitioned into d×d blocks:

$$V = \begin{pmatrix} V_{11} & V_{12} \\ V_{21} & V_{22} \end{pmatrix} \quad (20)$$

and the matrix $\phi_i$, containing the eigenvalues of $-V_{12}V_{22}^{-1}$.

Step (7) The directions of arrival are estimated from $\phi_i$, using equation (15).

Another alternative approach, which may be preferable with larger matrices, is to use the sample covariance matrix $\hat{R}_{ZZ}$, which is m×m. The eigenvectors corresponding to the d largest eigenvalues of $\hat{R}_{ZZ}$ form the basis for the approximate rangespace.

If the processing capability is available, it is contemplated that polarization may be done for the adaptive processing too. Polarization is another degree of freedom that can be applied. Polarization may be added on to jamming cancellation or superresolution. One of ordinary skill can readily design the radar transmission and reception to measure whether the polarization is right-circular, left-circular, horizontal or vertical. So basically, the net effect is to double the degrees of freedom. Processing the polarization information entails more computations.

Although the invention has been described in terms of exemplary embodiments, it is not limited thereto. Rather, the appended claim should be construed broadly, to include other variants and embodiments of the invention, which may be made by those skilled in the art without departing from the scope and range of equivalents of the invention.

What is claimed is:

1. A method for detecting one or more radar targets of interest in the presence of jamming signals, said method comprising the steps of:

(a) forming a plurality of sub-arrays from an antenna array;

(b) adaptively forming sub-array beams so as to point one or more nulls in one or more respective directions corresponding to one or more jammers; and (c) applying a superresolution technique to determine a count of the one or more radar targets.

2. The method of claim 1, wherein the super-resolution technique determines a respective direction of arrival corresponding to each of the one or more radar targets.

3. The method of claim 1, wherein the superresolution technique is one of the group consisting of a MUSIC algorithm and an ESPRIT algorithm.

4. The method of claim 3, wherein the superresolution technique is one of the group consisting of a 1-dimensional ESPRIT algorithm and a 2-dimensional ESPRIT algorithm.

5. The method of claim 1, wherein step (b) includes determining adaptive weights so that each of the plurality of sub-arrays has substantially identical nulls responsive to a plurality of jammers.

6. The method of claim 5, wherein the plurality of jammers include one or more sidelobe jammers or one or more mainlobe jammers.

7. The method of claim 1, wherein step (b) includes assigning substantially the same adaptive weights to each of the plurality of sub-arrays.

8. The method of claim 1, wherein step (c) includes resolving a plurality of targets within a single resolution cell.

9. A system for detecting one or more radar targets of interest in the presence of jamming signals, comprising:
   means for forming a plurality of sub-arrays from an antenna array;
   means for adaptively forming sub-array beams so as to point one or more nulls in one or more respective directions corresponding to one or more jammers; and
   means for applying a super-resolution technique to determine a count of the one or more radar targets.

10. The system of claim 9, wherein the super-resolution technique determines a respective direction of arrival corresponding to each of the one or more radar targets.

11. The system of claim 9, wherein the super-resolution technique is one of the group consisting of a MUSIC algorithm and an ESPRIT algorithm.

12. The system of claim 11, wherein the super-resolution technique is one of the group consisting of a 1-dimensional ESPRIT algorithm and a 2-dimensional ESPRIT algorithm.

13. The system of claim 9, wherein the sub-array beam forming means determines adaptive weights so that each of the plurality of sub-arrays has substantially identical nulls responsive to a plurality of jammers.

14. The system of claim 13, wherein the plurality of jammers include at least one sidelobe jammer and at least one mainlobe jammer.

15. The system of claim 9, wherein the sub-array beam forming means assigns substantially the same adaptive weights to each of the plurality of sub-arrays.

16. The system of claim 9, wherein the super-resolution technique applying means is capable of resolving a plurality of targets within a single resolution cell.

\* \* \* \* \*